May 6, 1969 D. W. HAMM ET AL 3,442,519

MONORAIL PISTON RING

Filed Sept. 20, 1967

INVENTORS
DOUGLAS W. HAMM
KENNETH J. NISPER

BY Price, Heneveld
Huizenga & Cooper
ATTORNEYS

United States Patent Office 3,442,519
Patented May 6, 1969

3,442,519
MONORAIL PISTON RING
Douglas W. Hamm, Muskegon, and Kenneth J. Nisper, Spring Lake, Mich., assignors to Muskegon Piston Ring Company, Muskegon, Mich., a corporation of Michigan
Filed Sept. 20, 1967, Ser. No. 669,066
Int. Cl. F16j 9/06; F02f 5/00
U.S. Cl. 277—140                                    7 Claims

ABSTRACT OF THE DISCLOSURE

This invention is concerned with a piston ring of the expander-spacer type in which the expander-spacer has, at least, on one side, a segmented scraper, the other side may consist of rail seats which receive, support and apply radial tension to a parted rail of conventional design or it may consist of segmented scrapers. The segments of the scraper edge of the ring are arched along a line extending circumferentially of the ring, substantially mid-point between the radial inner and outer faces of the ring, creating a crown. The crown may be formed by other means. This crown provides line contact with the ring groove and controls the twist or tilt attitude of the ring in the ring groove resulting from the radial or other forces incident to the ring's operation.

Cross-reference to related application

This invention, when it incorporates rail seats, relates to one of the rings which can be fabricated by the method described in our co-pending application Ser. No. 669,067, entitled Method of Making Piston Rings, filed Sept. 20, 1967.

Background of the invention

The invention is a piston ring having a circumferential crown approximately midway between the inner and outer radial edges of the scraper segments. In the form of the ring having scraper segments on both sides, this construction provides a ring which can have high unit side pressure to form a side seal without having such frictional resistance to radial movement that it loses its ability to conform to the cylinder wall.

The invention, in its other form, is a piston ring which, when installed, is a combination of a rail and an expander-spacer having, on one side, a plurality of scraper segments which, along with the rail, effect a seal against the cylinder wall. The expander-spacer provides radial tension both to the segments and to the rail.

This invention relates to the general class of rings illustrated in U.S. Patent 3,212,785, entitled, "Oil Ring," issued Oct. 19, 1965 and also to the general class of rings illustrated in FIGS. 14 through 17 of U.S. Patent 2,635,022, entitled, "Piston Ring Assembly," issued Apr. 14, 1953. The general type of ring is also illustrated in U.S. Patents 3,191,947, entitled "Piston Rings," and 3,191,948, entitled, "Piston Rings," both issued June 29, 1965. The ring incorporates the rail support pillar feature of U.S. Patent 3,174,760 entitled, "Piston Ring," issued Mar. 23, 1965. Because of tolerance accumulations in rings of this type having a rail segment, the expander-spacers of these earlier patents frequently were unable to make the adjustments required by tolerance variations without either binding in the groove or twisting non-uniformly. The expander-spacer was unable to assume a proper attitude in the groove. It was found that such rings frequently do not provide the desired application of force to the rail to cause it to seat properly to effect the most efficient seal. Sometimes, when the rail seated properly, the expander-spacer was unable to effect a full seal with the scraper segments.

Summary of the invention

The particular feature of the invention is the use of a crown in the segments which permits the ring or the expander-spacer to adjust itself to a canted or tilted position for maintaining both the rail and the scraper segments in proper position to effect a seal. This feature is combined with pillars adjacent the outer radial face of the ring for direct transmission of loads between the side segments or between the rail and segments during certain phases of the ring's operating cycle. The incorporation of the crown permits the expander-spacer to adjust its position in response to the fit of the rail to the expander-spacer, which fit, results from accumulation of manufacturing tolerances.

Description of the preferred embodiment

Figure 1:
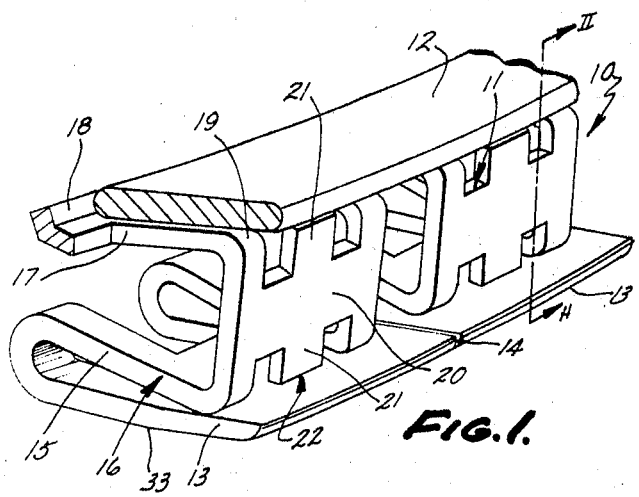
FIG. 1 is a fragmentary oblique view of a ring incorporating this invention viewed from the radial outer face of the ring.

Referring specifically to FIG. 1, it will be seen that the ring 10 consists of an expander-spacer 11 and a rail 12. The expander-spacer 11, on its lower side, has a plurality of segments 13 separated from each other by separations or parting lines 14 permitting the segments to act independently of each other. Integral with the inner radial edge of each of the segments 13 are struts 15. A pair of the struts 15 are integral with each of the segments.

The struts 15 are part of the springs 16 which include not only the struts but also the rail seat 17 and rail stops 18. The springs are formed into a loop having its base portion 19 adjacent the radial outer face of the ring. At the base of the loop and along this radial outer face, adjacent springs 16 are joined by a circumferentially extending, continuity web 20. At the center of this web are a pair of oppositely extending vertical ears 21 which, together with the portion of the web between them, form a pillar 22 extending most of the distance between the segments 13 and the rail 12.

Figure 4:
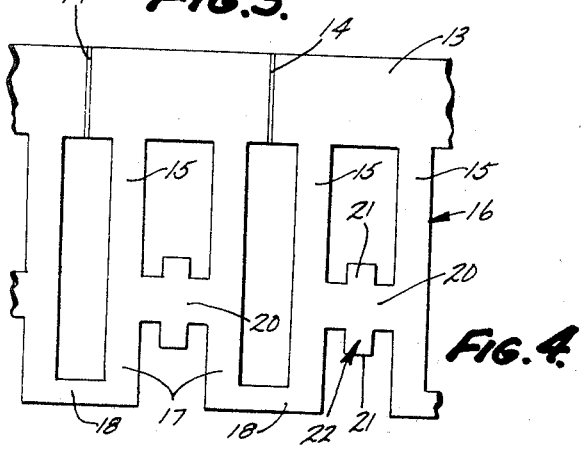
FIG. 4 is a flat pattern of the ring before it is shaped to the cross-sectional configuration of the final ring.

Each of the struts of a spring 16 is integral with two adjacent segments, with one strut connected to one of the segments and the other strut connected to an adjacent segment. Along the upper inner radial edge of the ring those portions of the spring 16 forming the rail seats 17 are joined by a bar which is turned upwardly at an angle to form the rail stop 18. This bar is the only connection between adjacent segments. The precise configuration or pattern of the expander-spacer can be understood by comparing its flat pattern in FIG. 4 with the completed ring in FIG. 1.

Figure 2:
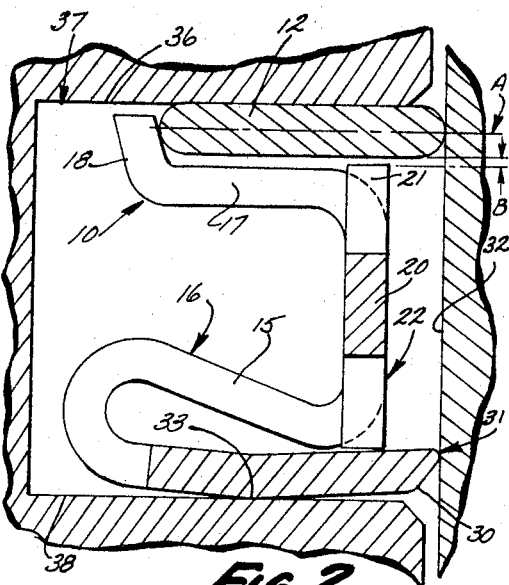
FIG. 2 is a cross-sectional view taken along the plane II—II of FIG. 1, showing the expander-spacer in normal position.

In FIG. 2 it will be seen that the lower outer or scraper edge of the segments 13 is chamfered at 30 and has a slightly rounded nose 31 permitting it to rock slightly with respect to the cylinder wall 32. Also in this figure, it will be noted that the segment is arched downwardly or convexly forming a crown 33. This crown is located adjacent, but not necessarily at, the midpoint between the inner and outer radial faces of the ring. The crown 33 is formed in the flange from which the segments are made before the ring is coiled. Therefore, the crown traces a curve circumferentially of the ring corresponding to the curvature of the ring. By reason of the crown the segments, both radially outwardly and radially inwardly from the crown, have an upward angle of from three to five degrees.

FIGURE 2 illustrates the position of the rail 12 and the expander-spacer 11 when all manufacturing tolerances cancel out, resulting in an ideal situation. In this position, the rail 12 seats against the upper side 36 of the ring groove 37, is spaced above the rail seat 17, the top of the pillar 22 and its rounded, inner radial edge is tangent to the radially, inwardly and upwardly inclined rail stops 18 at a point below the rail's centerline A. In this situation, the gap B between the rail and the top of the pillar 22 is about .005". The expander-spacer 11 is evenly balanced about the crown 33. When the tolerances cancel out to produce the ideal situation illustrated in FIG. 2, the crown 33 is not necessary. This, however, is a theoretical idea, seldom obtained in practice. The normal situation deviates toward one or the other of the extremes illustrated in FIG. 3.

Figure 3:
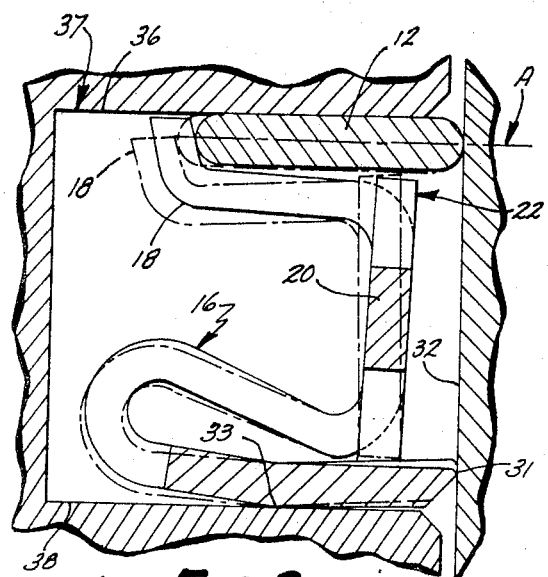
FIG. 3 is a sectional-elevation view identical to FIG. 2 but showing the expander-spacer in solid lines at one limit of tilt and in broken lines at the opposite limit of tilt.

The situation illustrated in solid lines in FIGURE 3 occurs when the tolerances accumulate on the negative side necessitating an upward and outward shifting of the rail stops 18 to make contact with the inner edge of the rail. When this happens, it will be noted that the point of tangency between the rail stops 18 and the rail 12 shifts upwardly but remains below the centerline A. The gap B between the rail and the top of the pillar 22 increases. The entire expander-spacer 11 rocks outwardly about the crown 33. Because of the presence of the crown 33 the expander-spacer is free to do this. If the segments 13 were of conventional design, the segments would lie flat against the lower side 38 of the ring groove and the tendency of the expander-spacer to adjust to seat against the rail would be resisted. The result, in any case, would be excessive bearing pressure against the lower side of the ring groove interfering with the radial movement of the segments. In addition, in some cases the segments might be restrained against shifting into contact with the cylinder wall 32, impairing the seal. In other cases, the rail stops would not contact the rail as the contact would be insufficient to apply adequate radial tension to the rail. This seriously impairs the sealing efficiency of the ring.

The situation illustrated in broken lines in FIG. 3 occurs when the tolerances accumulate on the positive side necessitating an inward shift of the upper portion of the expander-spacer. In this case, it will be noted that the expander-spacer rocks backwardly about the crown 33. Once again, binding between the segments 13 and the bottom side 38 of the ring groove is prevented and the segments are free to shift into full sealing contact with the cylinder wall 32. In this situation the gap B is reduced to about .001". It is important that this gap not be entirely closed except during certain phases of the ring's operation, as will be explained subsequently. It is also important that the top edge of the rail stops 18 always project slightly above the rail's centerline 14 and also maintain a minimum clearance from the upper side of the ring groove, for example a minimum of .001".

Basically the function of the crown 33 is two-fold. It permits the expander-spacer to adjust readily to the various expander-spacer to rail fits arising out of tolerance variations. It also maintains, under all conditions, an effective line seal with the lower side of the ring groove. The presence of the crown permits the rail 12 and the expander-spacer to be manufactured within tolerances which are practical in mass production techniques without requiring selective tolerance mating of the two parts.

During operation of the engine, the rail 12 will shift between the positions illustrated in FIGS. 2 and 3 to a position in which it is seated on the upper end of the pillar 22 during a portion of each cycle. This will occur during the power and compression strokes. During these strokes the pillar will also contact the segments 13, thus forming a rigid support between the rail and segments.

The rounded nose 31 and lower chamfer 30 along the outer radial edge of the segments 13 permits them to rock about the cylinder wall 32 while maintaining an effective seal. These features cooperate with the crown 33 in allowing the expander-spacer to freely adjust its position to that which is most effective.

Due to the presence of the crown, the expander-spacer can tilt, yet the resistance to radial movement of the expander-spacer with relation to the lower side of the ring groove will be only slightly increased, if at all. At the same time a good seal will be formed along the crown since the narrow area of contact will create a relatively high unit pressure against the side of the ring groove. However, due to the limited area of contact, the total frictional resistance will not be such as to cause the expander-spacer to bind and therefore fail to effect a seal against the cylinder wall 32.

Figure 5:
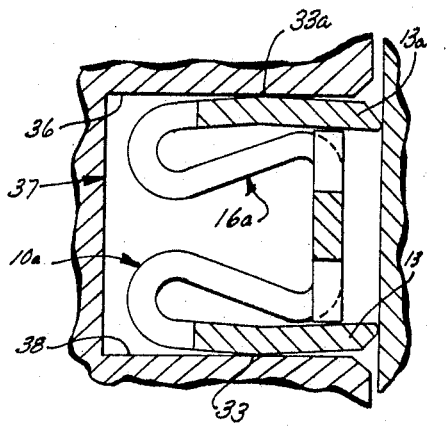
FIG. 5 is a sectional elevation view similar to FIG. 2 showing the ring with crowned segments on both sides.

FIG. 5 illustrates the invention applied to a one-piece piston ring 10a, rather than to an expander-spacer. The ring 10a is of symmetrical cross section, having segments 13 on the lower side and segments 13a on the upper side connected by the springs 16a. The segments 13 having a crown 33 and the segments 13a have a crown 33a. The resulting ring 10a has line contact with both the upper and lower sides 36 and 38 of the ring groove 37. The unit bearing pressure exerted against the sides of the groove can be significantly increased without impairment of the ring's ability to shift radially. Because of the line contact created by the crown, the ring has increased freedom of movement to adjust to slight irregularities in the cylinder wall and to slight deviations of the plane of the ring groove from horizontal. In the ring 10a the pillar 22 has the same functional and physical characteristics as it does in ring 10.

Figure 6:
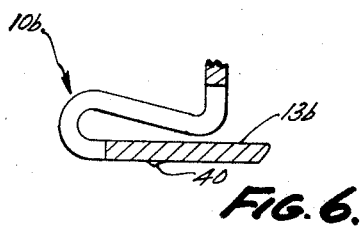
FIG. 6 is a fragmentary sectional elevation view of a modified form of this invention.

FIG. 6 illustrates another way in which the crown can be formed. In this case a bead 40 or suitable material is secured to the lower side of the segments. This bead may be formed by plating to a suitable thickness as with chromium or by brazing or, in some cases, by the application of a suitable plastic material, an example of which might be nylon type 6—6, military specification Mil. P-4606(MR). This bead 40 is preferably slightly higher than the crown formed by arching to compensate for the lack of inclination of the segments 13b both upwardly and outwardly of the bead 40. Both the convex arch 33 and the bead 40 form a narrow circumferentially extending circular ridge acting as a fulcrum about which the expander-spaced 10b may rock. It will be recognized that the bead can be applied to both the upper and lower segments.

This invention is particularly useful in the modern engine where the combination of short stroke, small bore, narrow ring grove and sustained high speed operation are becoming common. Under such circumstances, rings of this type are subjected to extremes of momentum and inertial forces as well as extremes in demand from high power to high vacuum conditions. Rings operating under these circumstances must be free to move radially and yet at the same time must effect a continuous and effective seal with both the cylinder and boh sides of the ring groove.

While a preferred embodiment and a modification of this invention have been described, it will be recognized that other modifications may be made within the framework of this embodiment.

We claim:
1. An expander-spacer having a body formed from a ribbon of thin metal and having at least one side, said side being segmented and forming a scraper edge, the improvement comprising each of said segments along a circumferential line spaced from both the inner and outer radial faces of said expander-spacer having an outwardly projecting ridge forming a narrow fulcrum curved lengthwise and extending circumferentially of said expander-spacer.

2. An expander-spacer as described in claim 1 wherein said fulcrum forming ridge is formed by a convex arch in said segments.

3. An expander-spacer as described in claim 1 wherein said fulcrum is adjacent the midpoint between said inner and outer radial faces.

4. An expander-spacer as described in claim 1 wherein said body has a second segmented side forming a second scraper edge, the segments of said second side along a circumferential line spaced from both the inner and outer radial faces of said expander-spacer having an outwardly projecting ridge forming a narrow fulcrum curved lengthwise and extending circumferentially of said expander-spacer.

5. An expander-spacer as described in claim 1 wherein said body has a second side, said second side having a plurality of rail seats, rail stops and a rail seated on said seats and against said stops; said expander-spacer as it torsionally twists rocking about said fulcrum in response to radial tension and to the forces exerted by the fit between said body and said rail.

6. An expander-spacer as described in claim 5 wherein the central portion of said body has a plurality of struts integral with the segments of said segmented edge along the radial inner edges of the segments; said struts each being formed into a radially outwardly extending loop and adjacent the radial outer face of said ring alternate pairs of said struts being joined by connecting webs; each of said webs having a pair of oppositely and axially extending protrusions; each pair of said protrusions forming pillars for supporting said rail and said segments and limiting axial movement thereof.

7. An expander-spacer as descrbed in claim 5 wherein said body has a plurality of axially positioned pillars adjacent its radially outer face extending from said rail to said segments and positioned substantially radially outwardly of said fulcrum for transmitting axial forces of said rail to said segments.

References Cited
UNITED STATES PATENTS

| | | | |
|---|---|---|---|
| 2,474,493 | 6/1949 | Phillips | 277—139 |
| 2,768,038 | 10/1956 | Cable | 277—140 |
| 2,827,349 | 3/1958 | Burns | 277—140 |
| 3,359,872 | 12/1967 | Foster | 92—201 X |

LOUIS K. RIMRODT, *Primary Examiner.*